(12) United States Patent
Seitz et al.

(10) Patent No.: US 6,976,665 B2
(45) Date of Patent: Dec. 20, 2005

(54) ELECTROMAGNETICALLY ACTUATABLE VALVE

(75) Inventors: Stefan Seitz, Waltenhofen (DE); Andreas Schrade, Immenstadt (DE); Guenther Schnalzger, Blaichach (DE); Hubert Hueber, Weitnau (DE); Martin Kirschner, Blaichach (DE); Ralph Appelt, Blaichach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/843,363

(22) Filed: May 12, 2004

(65) Prior Publication Data

US 2004/0227398 A1 Nov. 18, 2004

(30) Foreign Application Priority Data

May 13, 2003 (DE) .............................. 103 21 413

(51) Int. Cl.[7] ............................................ F16K 31/06
(52) U.S. Cl. ......................... 251/129.07; 251/129.02; 303/119.2
(58) Field of Search ..................... 251/129.02, 129.07; 303/119.1, 119.2

(56) References Cited

U.S. PATENT DOCUMENTS

| | | | | |
|---|---|---|---|---|
| 5,401,087 A | * | 3/1995 | Goossens | 303/119.2 |
| 5,645,325 A | * | 7/1997 | Mueller et al. | 303/119.2 |
| 5,649,748 A | * | 7/1997 | Oehler et al. | 303/119.2 |
| 5,683,151 A | * | 11/1997 | Friedow et al. | 303/119.2 |
| 6,086,164 A | * | 7/2000 | Oehler et al. | 303/119.2 |
| 6,152,420 A | * | 11/2000 | Hohl | 251/129.02 |
| 6,415,820 B1 | * | 7/2002 | Gluf, Jr. | 137/625.65 |

* cited by examiner

*Primary Examiner*—J. Casimer Jacyna
(74) *Attorney, Agent, or Firm*—Ronald E. Greigg

(57) ABSTRACT

An electromagnetically actuatable valve for hydraulic control devices in motor vehicles is embodied as a pressure-equalized seat valve in a mode of construction comprising a hydraulic part with a valve dome and an electrical part that can be slipped onto the valve dome. In a magnet valve that is normally open, the tubular tappet that supports the closing member is supported at one point in a first bearing point, in terms of the longitudinal direction, that is embodied as a slide bearing, and a bearing ring that forms the sealing point accomplishes the hydraulic pressure equilibrium with the effective sealing diameter of the closing member that together with the valve seat forms the second bearing point. With the valve, very short switching times, in particular less than 0.5 ms, can be achieved with an economical mode of construction.

20 Claims, 2 Drawing Sheets

ELECTROMAGNETICALLY ACTUATABLE VALVE

BACKGROUND OF THE INVENTION

1. Field of the Invention

The invention is directed to an improved electromagnetically actuatable valve for a hydraulic control device for a motor vehicle.

2. Description of the Prior Art

One electromagnetically actuatable valve of the type with which this invention is concerned is known from German Patent Disclosure DE 195 36 619 A1 and is suitable for hydraulic controls in traction-controlled brake systems. For economical mass production, this valve is provided with simple parts by providing that the magnet valve has a hydraulic part with a valve dome, onto the outside of which valve dome the electrical part of the valve with the electromagnet is slipped. To embody this valve for high pressures and fast switching, it is embodied as a pressure-equalized seat valve. For the pressure equilibrium, in this magnet valve, the tappet that carries the actual closing member is hollow and embodied with a continuous longitudinal bore, in which a pin is guided with a relatively narrow gap and thus tightly; the pin diameter and the effective sealing diameter at the closing member are of equal size, in order to achieve the pressure equilibrium. Moreover, over a long axial range, the tappet is guided with its jacket face in a housing bore in such a way that a gap for transmitting pressure from an outflow opening into a pressure chamber of the valve dome is available for the pressure equilibrium of the seat valve. Although this valve is already economical in construction and makes a fast switching time possible, these sealing provisions on the piston principle, with long pistons and bores and with sealing gaps and leakage gaps, mean that the switching times are technologically limited and are therefore unsuitable for some applications that involve especially short switching times. Moreover, this valve is embodied only as a magnet valve that is normally open and does not make a valve construction that is normally closed possible. The pin in the tubular, longitudinally movable tappet is braced against the housing and also makes for a complicated construction, which is moreover less well suited to miniaturization of valves.

From European Patent Disclosure EP 0 720 551 B1, an electromagnetically actuatable valve is also known which by its simple construction is suitable for economical mass production and can be embodied as either a normally closed or a normally open magnet valve of the seat valve type. However, in this valve, there are different ratios of surface area in the hydraulic region, and hence this valve is not pressure-equalized; moreover, it has relatively long sealing provisions based on the piston principle, with a leakage gap between the piston and the bore, so that these valves too are limited in terms of the pressure that can be switched and their switching times to such an extent that they cannot meet especially stringent demands. This is above all true if switching times in the range of a millisecond or less are required.

From German Patent Disclosure DE 38 02 648 A1, an electromagnetically actuated valve is also known, which with a compact construction is embodied as a fast-switching, pressure-equalized seat valve. In this valve, through which the flow can be in both directions, the armature itself forms the movable closing member and is embodied for that purpose as a sleeve, which is disposed longitudinally displaceably on a guide pin that is structurally connected to the housing. Once again, the guide pin operates with axially relatively long seals on the piston principle, or seals with an O-ring are employed. Particularly the O-ring or an elastomer seal, because of their radial contact pressure, cause friction and thus problems that stand in the way of shortening the switching time. Also, this valve has a special structural form, which cannot be derived from valves, produced in large-scale mass-production, for traction-controlled brake systems.

OBJECT AND SUMMARY OF THE INVENTION

The electromagnetically actuatable valve of the invention has the advantage over the prior art that with it, given a simple, economical construction, the switching times can be reduced still further, making it possible to meet even especially stringent demands. Thus fast-switching valves can be achieved whose switching times are less than a millisecond and in particular less than 0.5 ms, since hydraulic contrary forces and damping are reduced to a minimum. Simple components that are already in mass production and economical seat valves can be employed. Moreover, both a normally open and a normally closed magnet valve can be realized. In this way, the valves can be used in an electrohydraulic valve controller for gas exchange valves in the inlet and outlet region of gasoline or Diesel engines, and because of the especially short switching times, even high engine speeds can be mastered.

By the provisions described below advantageous refinements of and improvements to the valve defined by the main claim are possible. A kind of two-point bearing is especially advantageous, so that axially long piston seals with leak fuel gaps are omitted entirely. Because of the radial bearing of the closing member means at only two points, which are as far apart as possible, a low-friction slide bearing is the result, which on the one hand assures an adequate pressure equilibrium and on the other permits very short switching times. In addition, centering the closing member in the sealing seat requires no additional effort or expense. In one embodiment of the valve, both production and design of the pressure equilibrium precisely in small valves can be favorably achieved. It is also advantageous if the valve is embodied with relatively great radial play in the housing; an interfering influence of alignment and angular errors of the tappet or armature can then be avoided in a simple way. Hydraulic damping is also avoided and a simple construction is favored. In an especially favorable embodiment despite component alignment errors and with simple production, a tight valve can always be achieved. Especially economical production is obtained if the bearing ring is formed directly onto the closing member means or is partially ground, thus dispensing with one additional component. Other embodiments are also practical for favoring simple mass production, by using a type of construction as in magnet valves for traction-controlled brake systems. A magnet valve that is normally open can be realized.

BRIEF DESCRIPTION OF THE DRAWINGS

The invention will be better understood and further objects and advantages thereof will become more apparent from the ensuing detailed description of preferred embodiments taken in conjunction with the drawings, in which.

DESCRIPTION OF THE PREFERRED EMBODIMENTS

Figure 1:
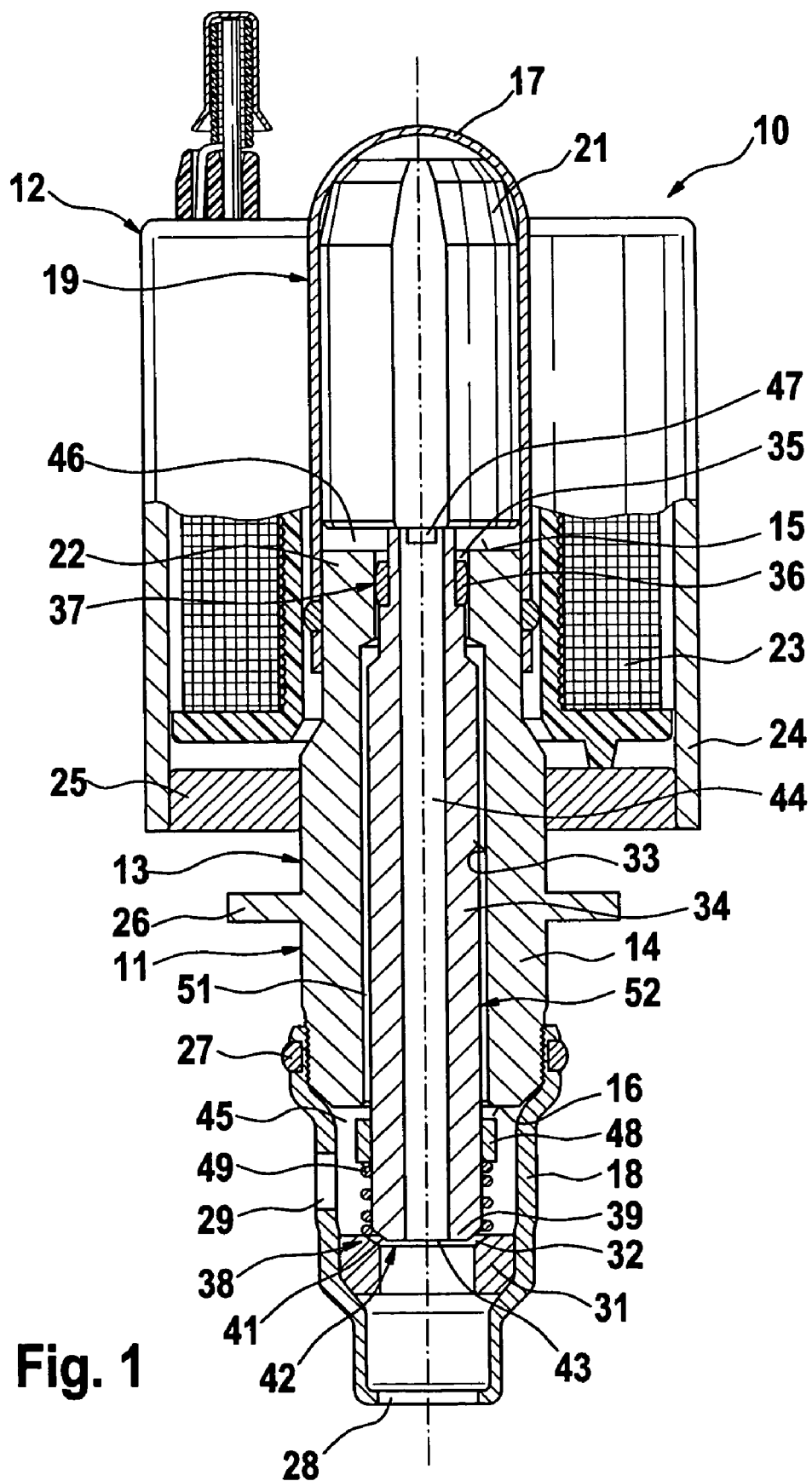
FIG. 1 is a longitudinal section through a first electromagnetically actuatable valve in a simplified view, and in a version as a magnet valve that is normally open.

FIG. 1 shows a longitudinal section through an electromagnetically actuatable valve 10 in a simplified view; it is embodied a fast-switching seat valve of pressure-equalized construction and as a normally open magnet valve. Valve 10 comprises a hydraulic part 11 with an electrical part 12 slipped onto it. For that purpose, the hydraulic part 11 has a valve housing 13, in which a cup-shaped, thin-walled capsule 17 and a pot-shaped valve sleeve 18 are secured tightly and firmly to a tubular valve insert 14 on the opposite ends 15, 16 of the valve housing. Part of the valve insert 14, together with the capsule 17, in this way forms a pressure-tight valve dome 19, in which magnetically operative elements such as an armature 21 and a magnet core 22 are received. The armature 21 is supported longitudinally movably in the capsule 17.

The electrical part 12 of the valve 10 is slipped onto this valve dome 19 in a manner known per se. An annular magnet coil 23 surrounds the valve dome 19. The magnet coil 23 is surrounded by a bell-shaped magnet housing 24, which on one end engages the capsule 17 and on the other rests on a yoke disk 25, which closes a magnetic circuit of the electrical part 12 via the valve insert 14. The yoke disk 25 can be firmly built into the magnet housing 24 and can contact the valve insert 14 closely, so that it can be slipped onto the valve dome 19 together with the electrical part 12.

The valve insert 14 also has an annular flange 26 on its outer circumference, with which flange the valve 10 can be inserted into a stepped bore, not identified by reference numeral, in a valve block and then, by wedging or crimping of the material comprising the valve block, which in particular is of lightweight metal, can be secured tightly and firmly, as is taught in particular by EP 0 720 551 B1 cited at the outset, in which this type of fastening is described in further detail for magnet valves for traction-controlled brake systems.

The valve sleeve 18 is tightly fastened to the lower end 16 of the valve insert 14 by an annular welding point 27; in this valve sleeve 18, an inflow opening 28 is disposed on the bottom and an outflow opening 29 is disposed radially. Between these openings 28, 29, an annular valve body 31, which centrally has a conical valve seat 32, is press-fitted tightly and firmly in the interior of the valve sleeve 18.

The tubular valve insert 14 has a continuous longitudinal bore 33, in which a tubular tappet 34 is disposed. This longitudinal bore 33 is stepped in the region of the upper end 15 and therefore forms a relatively short bearing bore 35 of smaller diameter, in which the tappet 34 is guided slidingly in the longitudinal direction by a bearing ring 36 on the outside. The bearing bore 35 and the bearing ring 36 extend axially over only a very short range, so that it can be said to be a kind of pointlike bearing point 37 here. While this first bearing point 37 is embodied on the end toward the armature of the tubular tappet 34 that penetrates the entire valve insert 14 longitudinally, a second bearing point 38 for the tappet 34 is located as far away from it as possible. For that purpose, on its end toward the valve seat 32, the tappet 34 has a closing member 39. This closing member 39 has a sealing face 41, embodied in the form of a spherical segment, which is located facing the conical valve seat 32 and is associated with it, so as to form the seat valve 42 that is connected between the inflow opening 28 and the outflow opening 29. This sealing face 41 annularly surrounds a central opening 43 of a conduit 44 that penetrates the tubular tappet 34 and causes both of its ends to communicate hydraulically with one another, so that by way of this conduit, an unhindered pressure equilibrium can be effected. Since the stroke of the tappet 34 is relatively short, the closing member 39 always remains inside the guide through the conical valve seat 32 and thus forms the second bearing point 38.

The effective sealing diameter of the closing member 39 in the valve seat 32 is embodied such that it is essentially the same size as the outside diameter of the bearing ring 36, which with the bearing bore 35 forms a slide bearing. In addition, the bearing ring 36 also provides a sealing point, which divides the chamber 45, communicating with the outflow opening 29, from the pressure chamber 46 in the capsule 17 in which armature 21 is received. This pressure chamber 46, via a transverse groove 47 in the tappet 34, is always in communication with the conduit 44. Because of this embodiment of the bearing points 37, 38, which at the same time function as sealing points, a hydraulically effective equilibrium in terms of area is created, which results in a valve construction that is pressure-equalized to both sides.

To compensate for production variations or errors in oblique positioning or axial errors, the bearing ring 36 secured to the tappet 34 is embodied on the outside in the form of a spherical segment, so that the sealing point is embodied essentially linearly. Via this linear sealing point of the first bearing point 37, a limited leak fuel flow can build up, but it can be reduced toward the respective other, pressureless connection.

In the region of the valve sleeve 18, a support ring 48 is pressed onto the tappet 34, near the closing member 39. A compression spring 49 surrounding the tappet 34 is braced on one end on this support ring 48 and on the other on the valve body 31 and thus keeps the seat valve 32, 39 open, resulting in a normally open magnet valve. In addition, the tappet 34 is adapted in terms of its outer diameter to the inner diameter of the longitudinal bore 33 in such a way that there is a relatively large annular gap 51; through this annular gap 51, an undamped pressure buildup can be achieved, and a situation in which, in the event of axial errors, two components touch one another outside the two bearing points 37, 38 and create problematic friction is averted. The tappet 34 is pressed by the compression spring 49 against the armature 21, which in turn is braced on the capsule 17 in a manner structurally connected to the housing. In the present valve 10 of the normally open type, the armature 21 is disconnected from the tappet 34, so that there are two different components. The two components 21, 24 are together referred to as closing member means 52, which are electromagnetically actuatable.

The mode of operation of the valve 10 will now be explained as follows, on the assumption that the basic function of such two-way seat valves is known per se.

The valve 10 is embodied as a valve that is open when without current and that furthermore functions as a pressure-equalized seat valve. A pressure fluid stream to be controlled can therefore flow from the inflow opening 28 to the outflow opening 29 or in the opposite direction through the seat valve. Any pressure difference that might occur in the flow between the valve seat 32 and the closing member 39 acts not only on the effective sealing face 41 but also on the counterpart pressure face of the same size at the first bearing point 37. Thus the pressure from the inflow opening 28 can build up unhindered in the tappet 34 and in the pressure chamber 46 via the conduit 44 and from the pressure chamber can act upon the bearing ring 36 from above, while the pressure in the outflow opening 29 can propagate unhindered via the annular gap 51 and can act upon the bearing ring 36 from below. Because of equal-sized hydraulically effective surface areas, the tappet 34 is hydraulically pressure-equalized. Depending on the pressure difference, a limited leak fuel flow through the sealing point 37 toward the lower pressure level can arise, but this leak fuel flow does not problematically affect the pressure equilibrium.

If the valve 10 is to be closed, the magnet coil 23 is excited and the armature 21 is thus moved, and the tappet 34 contacting the armature is deflected mechanically downward; the tappet 34 is moved, counter only to the force of the compression spring 49, until its sealing face 41 rests tightly on the valve seat 32. Because of the pointlike bearing points 37, 38, at which major friction resistances do not occur, especially fast reciprocating motions are made possible as a result, since there are no seals on the piston principle with long leakage gaps, nor are there any radial forces, causing friction, from O-rings or elastomer seals. In this way, switching times of less than 1 ms and in particular less than 0.5 ms can be attained. The valve 10 can therefore be used especially advantageously in electrohydraulic valve controllers of gas exchange valves in the inlet and outlet region of gasoline or Diesel engines, where high engine speeds as well as highly variable temperatures must be taken into account. The valves function with strokes of only approximately 0.3 to 0.6 mm.

If the valve 10 is switched by excitation of the magnet coil 23, then the armature 21 is pulled downward by the magnet core 22 and, via the tappet 34, presses the closing member 39 tightly against the valve seat 32 counter to the force of the compression spring 49; the seat valve is closed. If high pressure should thereafter prevail at the outflow opening 29 while the inflow opening 28 is relieved, then a leak fuel flow, flowing out via the bearing ring 36, can reach the pressure chamber 46 and flow onward away to the inflow opening 28 via the transverse groove 47 and the conduit 44. The situation is correspondingly the reverse if with the seat valve closed, pressure occurs at the inflow opening 28, and the outflow opening 29 is relieved. In both cases, the closing member means 52 remain pressure-balanced, so that with the valve 10, high pressures and short switching times can be controlled.

Figure 2:
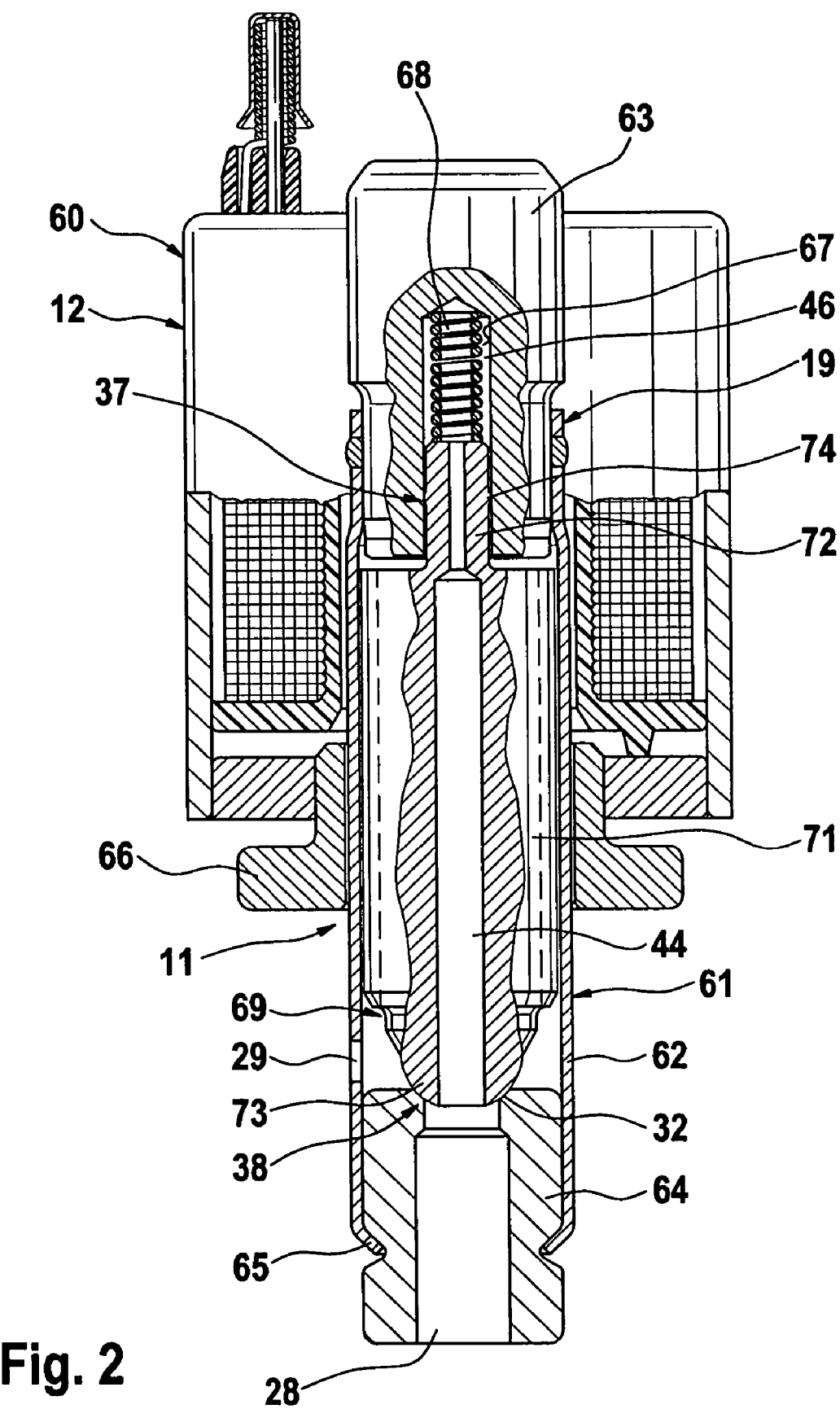
FIG. 2 is a longitudinal section through a second electromagnetically actuatable valve, in an embodiment as a magnet valve that is normally closed.

FIG. 2 shows a longitudinal section through a second valve 60, which differs from the first valve of FIG. 1 as follows, using the same reference numerals for the same structural elements.

In principle, the second valve 60 has the same makeup, comprising a hydraulic part 11 and an electrical part 12, but is embodied as a normally closed valve. For this purpose, the hydraulic part 11 has a different valve housing 61, in which a thin-walled housing sleeve 62, a pole core 63, and a valve body 64 are tightly secured to the opposite ends. The inflow opening 28 and the valve seat 32 are embodied on the hollow-cylindrical valve body 64, which is joined tightly and firmly to the housing sleeve 62 by a wedged feature 65. Because of the thin-walled housing sleeve 62, a reinforced annular flange 66 is provided for securing the hydraulic part 11 in a valve block. The valve dome 19 is now formed by the pole core 63 and part of the thin-walled housing sleeve 62, onto which part the electrical part 12 is slipped. The pole core 63 now has a central blind bore 67, which is open toward the valve body 64 and in which the pressure chamber 46 is embodied, and in which a compression spring 68 is now disposed.

The closing member means 69 are disposed longitudinally movably in the interior of the valve housing 61, and these closing member means 69 are embodied in one piece and essentially form the armature 71. On its upper end, the armature 71 has an integral stepped bolt 72 of lesser diameter, which protrudes into the blind bore 67, where with the aid of the first bearing point 37 it forms a slide bearing and a sealing point. For forming the first bearing point 37, the bearing ring 36 is formed integrally onto the closing member means 69; an annular bead 74 is partially ground on the jacket face of the stepped bolt 72 and in cross section has a spherical outer contour, so as to perform the functions of both a slide bearing and a sealing point. This one-piece mode of construction is especially economical for relatively large numbers of mass-produced items. On the opposite end of the armature 71, there is a closing member 73 which cooperates in a corresponding way with the valve seat 32 and at the same time forms the second bearing point 38. The armature 71 is penetrated by the conduit 44, so that by way of this conduit the inflow opening 28 is made to communicate hydraulically with the pressure chamber 46. The outflow opening 29 is now disposed in the thin-walled housing sleeve 62 itself.

The second valve 60 is thus embodied in a corresponding fashion to the first valve 10 of FIG. 1, such that the one-piece closing member means 69, namely the armature 71, is guided at only two pointlike bearing points 37 and 38. In addition, the area ratios at the closing member 73 and in the bearing point 37 are adapted to one another such that a hydraulically pressure-equalized seat valve is created. The armature 71 is disposed with a relatively great gap between its outer circumference and the thin-walled housing sleeve 62, so that no problematic friction occurs upon a motion of the armature. The mode of operation of the second valve 60 is logically equivalent to that of the first valve 10, with the difference that it is embodied as a normally closed valve.

It is understood that in the exemplary embodiments shown, variations may be made without departing from the concept of the invention. For instance, instead of the bearing ring 36 shown in FIG. 1, a spherical component that is pressed onto the tappet may be used. A bearing ring of this type can also be dispensed with entirely, if its guide face is ground directly on the moving part, that is, the tappet or the armature. Moreover, it is possible to transpose the components of the first bearing point kinematically and to provide the function of the former bearing ring in the component that is structurally connected to the housing. It could also be advantageous, for instance in the pole core of FIG. 2, to press-fit a suitable bearing of its own into the pole core. Still other changes may be made without departing from the concept of the invention.

The valve can be used as both a switching valve and a regulating valve. Because the effective surface areas are designed to be of unequal size hydraulically, the valve can be designed to open or close with slight pressure reinforcement. As a result, the valve can additionally be influenced in terms of its switching speed.

The foregoing relates to preferred exemplary embodiments of the invention, it being understood that other variants and embodiments thereof are possible within the spirit and scope of the invention, the latter being defined by the appended claims.

We claim:

1. In an electromagnetically actuatable valve for a hydraulic control device for motor vehicles, which valve is embodied as a seat valve in a pressure-equalized mode of construction, the valve comprising a hydraulic part having a valve housing with a pressure-tight valve dome in which magnetically operative elements, including an armature and a magnet core, are received, an inflow opening, an outflow opening, and between them a valve seat structurally connected to the housing disposed in the valve housing an electrical part of the valve which is slipped onto the valve dome and having both an electrical coil surrounding the valve dome and a coil housing that conducts magnetic flux, a closing member means, disposed longitudinally movably in the valve housing, which means, on its end toward the valve seat, carries a closing member which together with the valve seat controls the communication between the inflow opening the outflow opening, the closing member means having a conduit extending within it which when the valve is closed leads from the inflow opening to a pressure chamber disposed in the valve dome, the pressure chamber in turn having a pressure-fluid-carrying communication with the outflow opening, a compression spring by which the closing member means can be put into a defined terminal position, the longitudinally movable closing member means (52, 69) having a first bearing point (37) at a distance from the closing member (39, 73), the bearing point being pointlike when viewed in the axial direction and is formed by a bearing ring (36) that divides the pressure chamber (46) in the valve dome (19) from the outflow opening (29) in the manner of a sealing point (37), the effective sealing diameter (36) for a pressure equilibrium of the seat valve (32, 39) is equivalent to the effective sealing diameter of the seat valve (32, 39);

the bearing ring (36) being dimensioned to allow a limited leakage; and the conduit (44) in the closing member means (52, 69) enabling a hydraulic pressure equilibrium between the inflow opening (28) and the pressure chamber (46).

2. The valve in accordance with claim 1, wherein the closing member means (52, 69), in the manner of a two-point bearing, comprises a second bearing point (38), which is formed by the closing member (39, 73) together with the valve seat (32).

3. The valve in accordance with claim 1, wherein the sealing bearing ring (36) is disposed on the outside of the closing member means (52, 69).

4. The valve in accordance with claim 1, wherein the closing member means (52, 69) is disposed with relatively great radial play (51) in the valve housing (13, 61) in the region between the first bearing point (37) and the second bearing point (38).

5. The valve in accordance with claim 1, wherein the closing member (39, 73) on the end of the closing member means (52, 69) is embodied as an annular spherical segment, which surrounds a centrally located opening (43) of the conduit (44) and cooperates with a conical valve seat (32).

6. The valve in accordance with claim 1, wherein the bearing ring (36) of the first bearing point (37) has a spherical-segmental shape and is disposed slidingly in a cylindrical bore (35).

7. The valve in accordance with claim 1, wherein the bearing ring (36) that forms the sealing point is formed integrally (74) onto the closing member (69).

8. The valve in accordance with claim 1, wherein the valve housing (13) comprises a tubular valve insert (14), a cup-shaped capsule (17), and a pot-shaped valve sleeve (18), of which the latter two are secured firmly and tightly on opposite ends (15, 16) of the valve insert (14), and wherein the valve sleeve (18) in its interior receives a valve seat (32), which is connected between the inflow opening (28) and the outflow opening (29).

9. The valve in accordance with claim 1, wherein the closing member means (52) comprise a tappet (34) that carries the closing member (39) and an armature (21) that is separated from the tappet.

10. The valve in accordance with claim 9, wherein the armature (21) is received longitudinally movably in the valve dome (19) in the form of a cup-shaped capsule (17), while the end of the tappet (34) toward the armature (21) is supported by means of the first bearing point (37) with the bearing ring (36) in the tubular valve insert (14), and in particular in a stepped bearing bore (35).

11. The valve in accordance with one claim 9, wherein the tappet (34) is embodied as hollow and has a continuous conduit (44) extending between its two ends.

12. The valve in accordance with one claim 10, wherein the tappet (34) is embodied as hollow and has a continuous conduit (44) extending between its two ends.

13. The valve in accordance with claim 9, wherein the tappet (34) penetrates the tubular valve insert (14) and carries the closing member (39) on its end protruding into the pot-shaped valve sleeve (18).

14. The valve in accordance with claim 8, wherein a compression spring (49) which urges the closing member means (52), for a magnet valve that is normally open, in the direction of a terminal position is disposed in the pot-shaped valve sleeve (18).

15. The valve in accordance with claim 1, wherein the valve housing (61) comprises a housing sleeve (62), a pole core (63), and a valve body (64) that has the valve seat (32), the pole core (63) and valve body (64) being secured firmly and tightly to opposite ends of the housing sleeve (62), wherein the valve body (64) has the inflow opening (28), while the housing sleeve (62) receives the outflow opening (29), and wherein a blind bore (67) associated with the valve dome (19) is embodied in the pole core (63).

16. The valve in accordance with claim 14, wherein the closing member means (69) are embodied as a one-piece armature (71) which is received in the interior of the housing sleeve (62) and which carries the closing member (73) on its end toward the valve body (64) and on its opposite end has a bolt (72), which with the blind bore (67) of the pole core (63) forms the first bearing point (37) and defines the pressure chamber (46).

17. The valve in accordance with claim 15, wherein the armature (71) has a continuous conduit (74) extending between its two ends.

18. The valve in accordance with claim 16, wherein the armature (71) has a continuous conduit (74) extending between its two ends.

19. The valve in accordance with claim 15, wherein the compression spring (68) is disposed in the pole core and urges the armature (71) into a terminal position when the magnet valve is embodied as a normally closed valve.

20. The valve in accordance with claim 1, wherein the valve in combination with an electrohydraulic valve controller of a gas exchange valve in the inlet and outlet region of gasoline or Diesel engines.

* * * * *